United States Patent [19]

Brown

[11] 4,387,905

[45] Jun. 14, 1983

[54] MACHINE TOOL CHUCK

[75] Inventor: Ivan R. Brown, Breesport, N.Y.

[73] Assignee: Hardinge Brothers, Inc., Elmira, N.Y.

[21] Appl. No.: 211,339

[22] Filed: Nov. 28, 1980

[51] Int. Cl.³ .............................................. B23B 31/14
[52] U.S. Cl. ................................... 279/1 C; 279/118; 279/119
[58] Field of Search ............... 279/1 C, 118, 109, 2 R, 279/119

[56] References Cited

U.S. PATENT DOCUMENTS

| | | | |
|---|---|---|---|
| 1,711,787 | 5/1929 | Hopkins | 279/119 |
| 1,849,546 | 3/1932 | Lippard | 279/119 |
| 1,871,463 | 8/1932 | Olson | 279/119 |
| 2,207,621 | 7/1940 | Hite | 279/1 C |
| 2,729,459 | 1/1956 | Leifer | 279/1 C |
| 2,759,735 | 8/1956 | Cross | 2769/123 |
| 3,251,606 | 5/1966 | Oswald et al. | 279/119 |
| 3,984,114 | 10/1976 | Ovanin | 279/1 C |
| 4,009,888 | 3/1977 | Wallace | 279/1 C |
| 4,078,814 | 3/1978 | Rohm | 279/1 C |
| 4,097,053 | 6/1978 | Steinberger | 279/1 C |
| 4,139,206 | 2/1979 | Knohl | 279/1 C |
| 4,170,888 | 10/1979 | Golata | 279/1 C |

FOREIGN PATENT DOCUMENTS

| | | | |
|---|---|---|---|
| 2611923 | 9/1977 | Fed. Rep. of Germany | 279/1 C |
| 2248901 | of 1975 | France | 279/1 C |

Primary Examiner—William R. Briggs
Assistant Examiner—Steven B. Katz
Attorney, Agent, or Firm—Shelsinger, Arkwright, Garvey & Dinsmore

[57] ABSTRACT

A multi jaw rotary chuck for lathes and the like comprising a body having front and rear portions and including a bore, a plurality of spaced jaw guides in the front portion of the body, a plurality of movable master jaw supports for the jaws of the chuck, the jaw guides each having one of the master supports slideably guided thereby, a plurality of actuator plates in the body each mounted in spaced radial planes intersecting and parallel to the axis of the bore and each actuator plate having first, second and third apexes, the first apex of the plate having a hole and including a first dowel pin mounted in the hole and extending outwardly on either side thereof transverse to the plane of the respective plate, the second apex of each plate having a hole and including a second dowel pin mounted in the hole and extending outwardly on either side thereof transverse to the plane of its respective plate and generally parallel to the first dowel pin, pivot means on each of the actuator plates journalled in the body and positioned between its respective first and second dowel pins, a movable arcuate counterweight for each of the actuators operably connected to the first dowel pin and supported on the rear portion of the body, the second dowel pins each operably connected to one of the master jaw supports, a movable draw plug extending into the central bore and including actuator plate engaging means, the third apex of each of the actuator plates operably connected to the actuator plate engaging means, whereby upon moving of the draw plug rearwardly relative to the body, the actuator plates pivot about the pivot means and simultaneously shift the master jaw supports and counterweights to maintain positive grip on work when the body is rotated.

9 Claims, 7 Drawing Figures

FIGURE 5
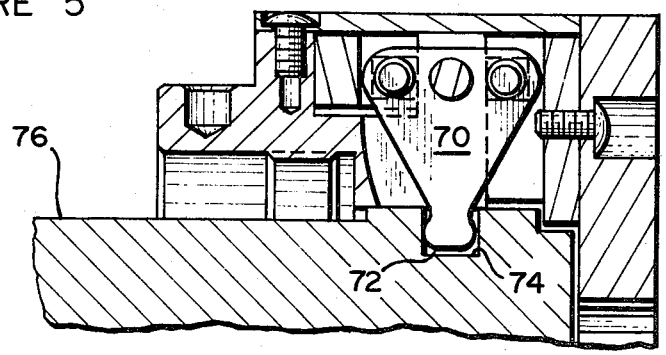
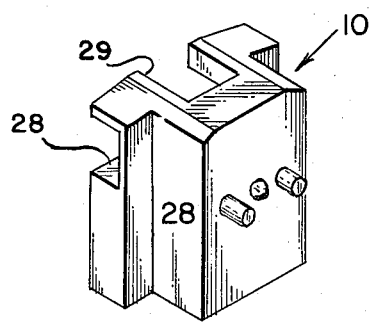
FIGURE 3a
FIGURE 3b
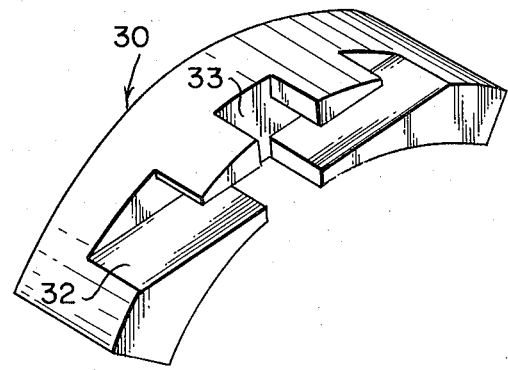

MACHINE TOOL CHUCK

This invention relates to rotary chucks having improved counterbalancing means for maintaining proper gripping pressure upon workpieces.

BACKGROUND OF THE INVENTION

The use of power operated rotary chucks in machining operations is well known in the art. When the chuck is operating at high speed, there is a tendency for the jaws to loosen their grip upon the workpiece due to the centrifugal force acting upon the jaws. The loosening tendency would be most apt to happen when light gripping pressures are used on parts which might be distorted by increased pressure. One such workpiece which is subject to damage from excessive gripping pressure is thin wall tubing. The need for a device to overcome the problems associated with centrifugal unloading, has lead to the development of various counterweighting mechanisms. These mechanisms are associated with jaw activating devices wherein centrifugal forces acting to disengage the jaw gripping members are counterbalanced by various weighting devices.

OBJECTS AND SUMMARY OF THE INVENTION

The present invention provides means for preventing centrifugal unloading by the use of a novel counterweight-jaw activator arrangement. The counterweights are arcuate in shape and situated entirely within the chuck. Interconnection between the jaw actuators and the counterweights is accomplished by pins passing through the jaw actuators and engaging chordal slots within the counterweight members. In a similar manner, interconnection between the jaw actuators and the jaw members is accomplished by pins passing through the jaw actuators and engaging slots milled into the master jaws.

The main body portion of the jaw chuck is provided with an annular recess in which the counterweights are positioned. The jaw actuators are pivoted around dowels positioned within the main body portion. Rotation of the jaw actuators around the dowel members is accomplished by a draw plug axially slideable within the main body portion.

It is therefore an object of the present invention to provide a rotary chuck having improved means for overcoming centrifugal unloading of the chuck jaws.

Another object of the invention is to provide means for eliminating excessive wear within the interior of the chuck.

It is another object of the invention to provide means for increasing the sensitivity of the gripping members when engaging easily deformable workpieces.

It is another object of the invention to provide a rotary chuck with means for applying equal forces to the work engaging members.

It is another object of the invention to provide means for accommodating a wide range of workpiece sizes.

It is another object of the invention to provide a rotary chuck having increased durability.

It is still another object of the invention to provide a rotary chuck having ease of assembly and disassembly.

These and other objects and advantages of the invention will be readily apparent in view of the following description and drawings of the above described invention.

DESCRIPTION OF THE DRAWINGS

FIG. 3a is a perspective view of the master jaw.

FIG. 3b is a perspective view of the counterweight.

FIG. 5 is a cross sectional view of a modified form of the actuator and draw plug assembly having been broken away from the chuck assembly.

DETAILED DESCRIPTION OF THE INVENTION

FIGS. 1 AND 2

Figure 1:
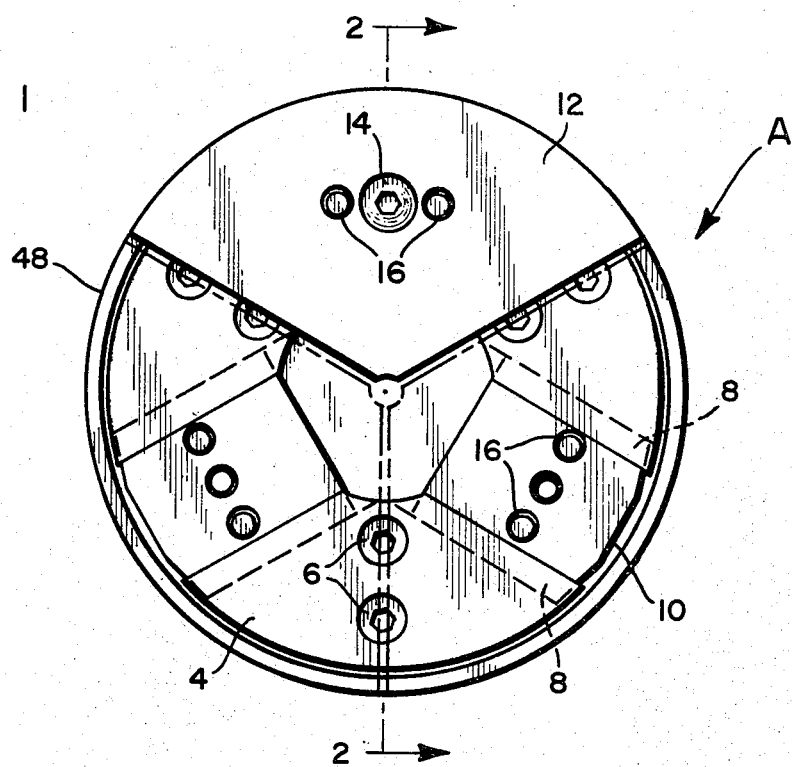
FIG. 1 is a front elevational view of the jaw chuck, partially broken away to show the master jaws and jaw guides.

Rotary chuck A is comprised of body portion 2 having three equally spaced jaw guides 4 attached thereto by screws 6. Jaw guides 4 have milled slots 8 in each of their back portions as indicated by dotted lines. Master jaws 10 are free to slide radially in the slots between jaw guides 4. Three work engaging pie jaws 12 are mounted to master jaws 10 by a screw 14 and two dowel pins 16 in each master jaw 10.

Positioned within body portion 2 are triangularly shaped actuators 18 which are free to pivot around dowel pins 20. Passing through the apexes of each actuator 18 are pins 22, 24 and 26. Each of the pins 22, 24 and 26 pass through actuators 18 and extend to either side thereof.

Each master jaw 10 has a transverse slot 28 and longitudinal slot 29, as shown in dotted lines, formed therein for interconnection with pin 22.

Arcuate counterweights 30 are provided for counteracting centrifugal forces during rotation of chuck A. Each counterweight 30 is provided with a slot 32 as shown in dotted lines, for interconnection with pins 24.

Body portion 2 includes a central opening 34 in which draw plug 36 is positioned. Draw plug 36 includes contoured longitudinal slots 38 for providing clearance with actuators 18. Annular slot 40 in draw plug 36 is provided for interconnection with pins 26. Draw collar 42 fits over shank 44 and is maintained on shank 44 by nut 46. Cylindrical cover 48 encompasses and is secured to a body portion 2 by screws 50.

FIGS. 3 AND 4

Figure 3:
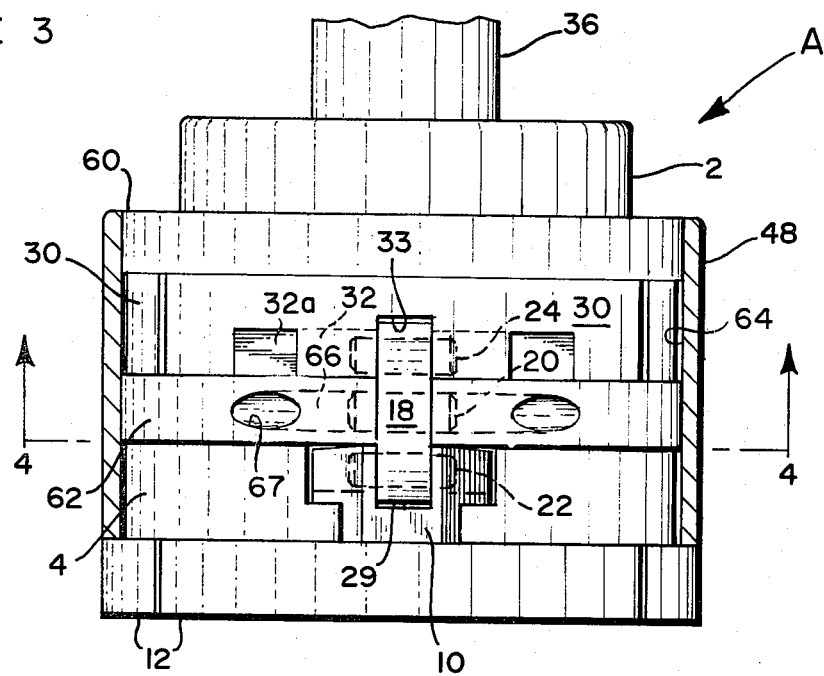
FIG. 3 is a side elevational view of the jaw chuck with a portion of the cover removed.
Figure 4:
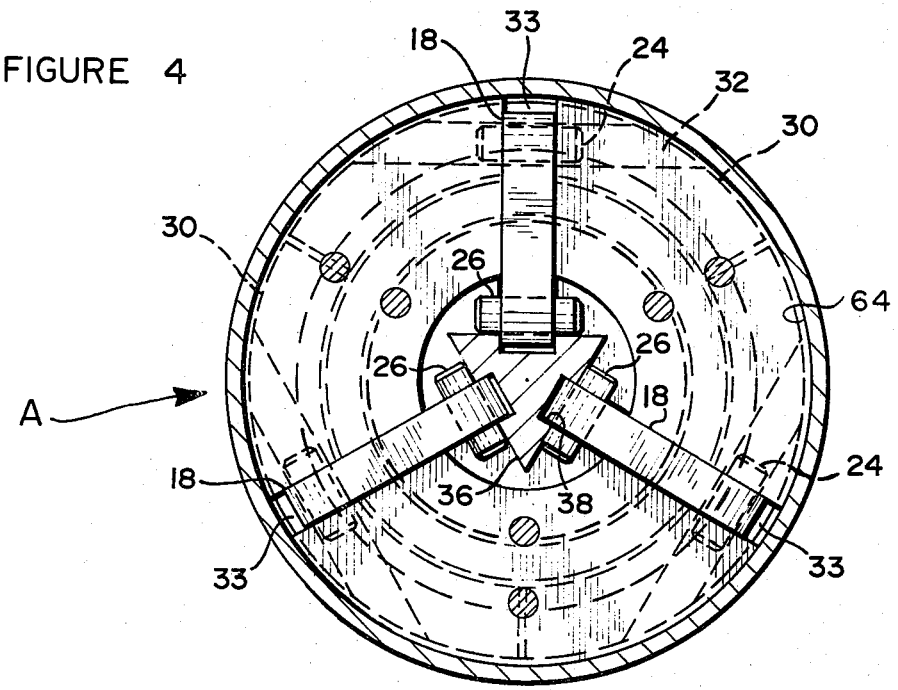
FIG. 4 is a cross sectional view of FIG. 3 with portions in relief, taken substantially along view in the direction of the arrows.

Referring now to FIGS. 3 and 4, body portion 2 is provided with annular flanges 60 and 62 with annular recess 64 therebetween. Arcuate counterweights 30 are situated in the annular recess 64. Dowel pins 20 which pass through and extend to either side of actuators 18, are positioned within chordal holes 66 in annular flange 62. Chordal holes 66 have openings 67.

As best shown in FIG. 4 each arcuate counterweight 30 is provided with chordal slot 32 in which a pin 24 is positioned. Chordal slot 32 has openings 32a. Actuators 18 extend into longitudinal slots 38 in draw plug 36.

FIG. 5

In FIG. 5, which is an embodiment of FIGS. 1 through 4, actuator 70 includes rocker arm 72 which engages annular slot 74 in draw plug 76.

OPERATION

In operation the rotary chuck works as follows. Rotary chuck A, which is comprised of body 2 is externally mounted on a machine tool spindle (not shown). Three equally spaced jaw guides 4 are mounted to the body 2 by means of screws 6. Master jaws 10 are free to slide radially in the slots between jaw guides 4. Jaw guides 4 have milled slots 8 within their back faces for the purpose of maintaining master jaws 10 in place.

Body 2 is provided with a central opening 34 in which a draw plug 36 is positioned. Body 2 is provided with annular flange 60, annular flange 62 and annular recess 64. Annular flange 62 has chordal holes 66 therein.

Three triangularly shaped actuators 18 are mounted on and pivoted about dowel pins 20 which are situated within chordal holes 66. Passing through and extending to either side of each actuator 18 are pins 22 and 24. Pin 24 engages a chordal slot 32 cut into each arcuate counterweight 30. The apex of each actuator having a pin 24, extends into a transverse slot 33 cut into each counterweight 30.

Pins 22 pass through and extend to either side of each actuator 18 and engage slot 28 formed in the back portions of each master jaw 10. The apex of each actuator 18 having a pin 22, is positioned within a longitudinal slot 29 perpendicularly intersecting slot 28 formed with the back portion of each master jaw 10.

Figure 2:
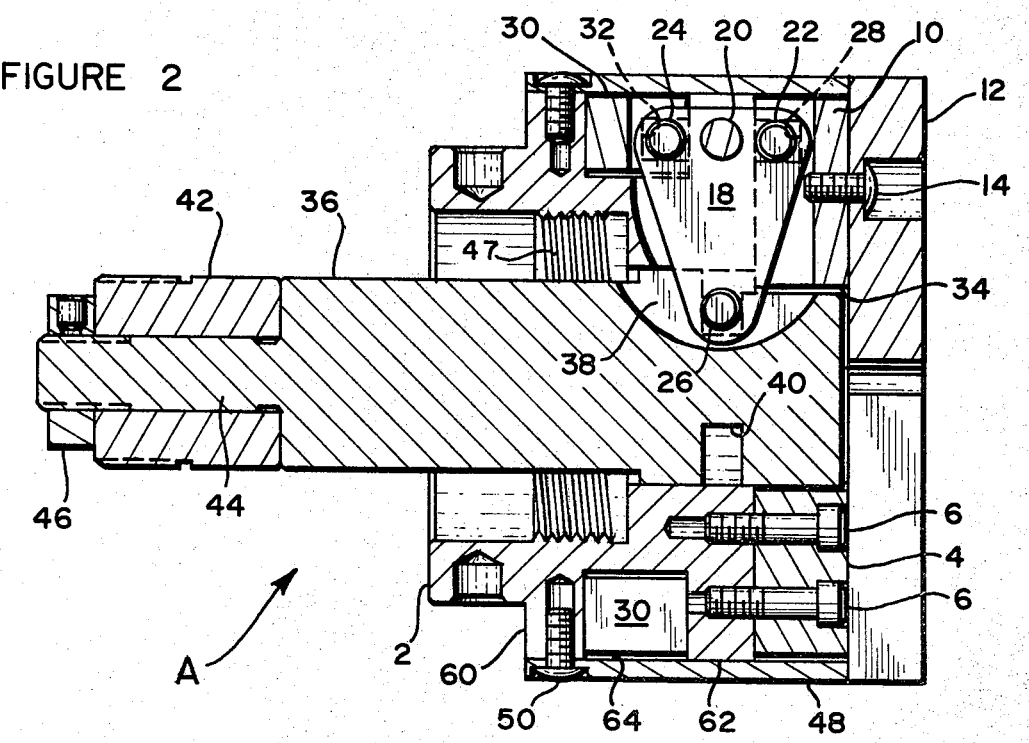
FIG. 2 is a cross sectional view of FIG. 1 with portions shown in relief, taken on line 2—2 and viewed in the direction of the arrows.

In the embodiment shown in FIGS. 1 through 4 pins 26 pass through and extend to either side of each actuator 18 and engage an annular slot 40 formed into draw plug 36. Clearance for the apex of each actuator 18 having a pin 26 is provided by contoured longitudinal slots 38 cut into draw plug 36. When draw plug 36, as best shown in FIG. 2, is moved to the left, actuators 18 are caused to pivot around dowel pins 20. This clockwise rotation of the actuators 18 causes master jaws 10 to slide radially inward in the closing direction, due to the action of pins 22 engaging slots 28. Conversely, a shift to the right of draw plug 36 will impart an outward or opening motion to master jaws 10.

Three equally spaced pie jaws 12 being mounted on dowel pins 16 and connected to master jaws 10 by screws 14 likewise move radially inward and outward in conjunction with master jaw 10. These pie jaws 12 provide the actual gripping force upon the workpiece (not shown).

Pie jaws 12 may be made of almost any machineable material, including plastic and aluminum. The use of aluminum being light weight will help to reduce centrifugal force when chuck A is rotating.

In practice, the machine operator would bore the pie jaws 12 in place, while the spindle (not shown) is rotating, to fit the particular workpiece (not shown). By doing this, the workpiece gripping diameter will be dead concentric with the machine spindle. For shapes other than round, pie jaws 12 can be machined off chuck A. From this it can be seen that one basic chuck A can be used with many different pie jaw configurations. Due to the machineable nature of pie jaws 12, they may be altered and reused almost at will.

When chuck A is rotating at high speed, there is a tendency for master jaws 10 and pie jaws 12 attached thereto to move outward due to centrifugal force. By the inclusion of arcuate counterweights 30 equally spaced around body portion 2, the centrifugal force acting upon the jaw members is counteracted. At high speed, the counterweights 30 tend to move outward and due to their engagement with pins 24, pins 22 exert sufficient pressure upon master jaws 10 to prevent a reduction in the gripping pressure on the workpiece.

Draw plug 36 may be moved manually, pneumatically, hydraulically or by any other type of collet closer or draw bar (not shown).

Referring to FIG. 2, draw collar 42 fits over shank 44 of the draw plug 36. Draw collar 42 is free to rotate around shank 44 and is maintained on shank 44 by nut 46. FIG. 2 shows a thread 47 on the body 2. The body 2 could be made to adapt to machines having different mounting configurations. It is also obvious that the draw plug 36 or draw collar 42 may be of different mounting configurations.

In an alternative embodiment as shown in FIG. 5, activators 70 are provided with bulbous rocker arms 72. Draw plug 76 includes an annular slot 74 formed therein. Rocker arm 72 engages the annular slot 174 and is responsive to movements to the left or right of the draw plug 77 as previously described.

An important aspect of the present invention is the ease in assembly and disassembly of the chuck. By unscrewing screws 50 and removing cylindrical cover 48, servicing of the exposed inner elements is readily achieved. Assembly or disassembly of the jaw guides 4 as well as counterweights 30 is achieved by the insertion or removal of dowel pin 20 which is readily accessible.

While preferred embodiments have been described in detail, it will be understood that various modifications or alterations may be made therein without departing from the spirit or scope of the invention set forth in the appended claims.

What is claimed is:

1. A multi jaw rotary chuck for lathes and the like, comprising:
   a. a body having front and rear portions and including a bore;
   b. a plurality of spaced jaw guides in said front portion of said body;
   c. a plurality of moveable master jaw supports for the jaws of said chuck;
   d. said jaw guides each having one of said master supports slideably guided thereby;
   e. a plurality of actuator plates in said body each mounted in spaced radial planes intersecting and parallel to the axis of said bore and each actuator plate having first, second and third apexes;
   f. said first apex of each plate having a hole and including a first dowel pin mounted in said hole and extending outwardly on either side thereof transverse to the plane of its respective plate;
   g. said second apex of each plate having a hole and including a second dowel pin mounted in said hole and extending outwardly on either side thereof transverse to the plane of its respective plate and generally parallel to said first dowel pin;
   h. pivot means on each of said actuator plates journaled in said body and positioned between its respective first and second dowel pins;

i. a moveable arcuate counterweight for each of said actuators operably connected to said first dowel pin and supported on the rear portion of said body;
j. said second dowel pins each operably connected to one of said master jaw supports;
k. a moveable draw plug extending into said central bore and including actuator plate engaging means;
l. said third apex of each of said actuator plates operably connected to said actuator plate engaging means;
m. said draw plug includes an inner end portion;
n. said inner end portion positioned within said body;
o. said inner end portion includes an annular slot;
p. said inner end portion includes arcuate longitudinal slots intersecting said annular slot for receiving the third apex of each of said actuator plates; and,
r. whereby upon moving said draw plug rearwardly relative to said body, said actuator plates pivot about said pivot means and simultaneously shift said master jaw supports and said counterweights to maintain positive grip on work when said body is rotated.

2. A multi jaw rotary chuck for lathes and the like as in claim 1 and wherein:
(a) said body includes an annular recess; and,
(b) said arcuate counterweights are positioned within said annular recess.

3. A multi jaw rotary chuck for lathes and the like as in claim 2 and wherein:
(a) said body portion includes an annular flange adjacent said annular recess;
(b) said annular flange includes a chordal opening for each of said pivot means; and,
(c) said pivot means includes a dowel pin for each of said actuator plates passing through and extending outwardly on either side of its respective actuator plate and engaging said chordal opening in said annular flange.

4. A multi jaw rotary chuck for lathes and the like as in claim 1 and wherein:
(a) each of said counterweights includes a chordal slot; and,
(b) said first dowel pin engages said chordal slot.

5. A multi jaw rotary chuck for lathes and the like as in claim 1 and wherein:
(a) each of said master jaw supports includes a transverse slot; and,
(b) said second dowel engages said transverse slot.

6. A multi jaw rotary chuck for lathes and the like as in claim 1 and wherein:
(a) each of said actuator plates includes a pin passing through its respective third apex and extending to either side of said actuator plate and engaging said annular slot formed in said draw plug.

7. A multi jaw rotary chuck for lathes and the like as in claim 1 and wherein:
(a) each of said actuator plates includes a bulbous portion engaging said annular slot.

8. A multi jaw rotary chuck for lathes and the like as in claim 6 and including:
(a) a cylindrical cover member secured to said body and surrounding said body and encompassing said actuator plates and said counterweights.

9. A rotary chuck for lathes and the like as in claim 7 and including:
(a) a cylindrical cover member secured to said body and surrounding said body and encompassing said actuator plates and said counterweights.

* * * * *